United States Patent
Stuessy et al.

(10) Patent No.: US 12,045,186 B2
(45) Date of Patent: Jul. 23, 2024

(54) MODULAR CABLE ASSEMBLY AND METHOD

(71) Applicant: Raytheon Company, Waltham, MA (US)

(72) Inventors: Alan G. Stuessy, McKinney, TX (US); Kendall Saer Ford, Sherman, TX (US); Kyle T. Province, McKinney, TX (US); John F. Grabow, McKinney, TX (US)

(73) Assignee: Raytheon Company, Tewksbury, MA (US)

( * ) Notice: Subject to any disclaimer, the term of this patent is extended or adjusted under 35 U.S.C. 154(b) by 4 days.

(21) Appl. No.: 17/990,281

(22) Filed: Nov. 18, 2022

(65) Prior Publication Data

US 2024/0168904 A1    May 23, 2024

(51) Int. Cl.
*G06F 13/38* (2006.01)
*G06F 1/26* (2006.01)
*G06F 13/40* (2006.01)

(52) U.S. Cl.
CPC ............ *G06F 13/387* (2013.01); *G06F 1/266* (2013.01); *G06F 13/409* (2013.01)

(58) Field of Classification Search
CPC ........................ G06F 13/409; H01R 13/6463
See application file for complete search history.

(56) References Cited

U.S. PATENT DOCUMENTS

| | | | |
|---|---|---|---|
| 6,131,125 A | 10/2000 | Rostoker | |
| 6,336,826 B1 * | 1/2002 | Kraft | H01R 13/6463 439/502 |
| 6,370,603 B1 * | 4/2002 | Silverman | G06F 13/385 710/63 |
| 6,978,319 B1 | 12/2005 | Rostoker | |
| 7,426,585 B1 | 9/2008 | Rourke | |

(Continued)

FOREIGN PATENT DOCUMENTS

BG         002306 U1    10/2016

OTHER PUBLICATIONS

EP Search Report for EP Patent Application No. 23210198.0 dated Apr. 17, 2024.

*Primary Examiner* — Getente A Yimer
(74) *Attorney, Agent, or Firm* — Getz Balich LLC

(57) ABSTRACT

A modular cable assembly for use with a system including a first system device and a second system device is provided. The first system device is configured to produce a first electronic communication protocol. The second system device is configured to produce a second electronic communication protocol. The modular cable assembly includes a first connector, a second connector, a cable body, and a communication control assembly. The communication control assembly includes a communication translation module (CTM). The CTM includes a protocol storage submodule configured to store a plurality of predetermined system device protocols (PSDPs) and a processor in communication with the protocol storage submodule storing instructions, which instructions when executed cause the processor to identify the second system device using a second selected PSDP of the plurality of PSDPs and translate at least a portion of the second electronic communication protocol into the first electronic communication protocol.

20 Claims, 8 Drawing Sheets

(56) References Cited

U.S. PATENT DOCUMENTS

| | | | |
|---|---|---|---|
| 8,924,518 B2 | 12/2014 | Witchey | |
| 10,949,441 B1* | 3/2021 | Streete | H04L 67/1097 |
| 11,145,408 B2* | 10/2021 | Sampath | G16H 40/00 |
| 2008/0013569 A1 | 1/2008 | Boren | |
| 2009/0216895 A1* | 8/2009 | Witchey | H04L 9/40 |
| | | | 370/467 |
| 2015/0081922 A1 | 3/2015 | Brett | |
| 2016/0062939 A1* | 3/2016 | Smith | G06F 13/409 |
| | | | 710/301 |
| 2019/0166174 A1* | 5/2019 | Moseman | F41G 1/54 |

* cited by examiner

MODULAR CABLE ASSEMBLY AND METHOD

BACKGROUND

1. Technical Field

The present disclosure relates to electronic data communications in general and, more particularly, to cable assemblies for translating electronic data communications.

2. Background Information

Electronic communications between electronic subsystems and components within a system have always been challenged by differences in communication standards and protocols. Communications within a system have often been accomplished using proprietary or custom interfaces between the various electronic subsystems and components. In many instances, these proprietary or custom interfaces were configured for a specific device or subsystem and were very often "fixed in time," meaning the interface was based on then existing software platforms or standards. When it later became desirable to modify or replace a subsystem, sensor, or the like, the existing protocol was no longer viable, and it was necessary to create a new specific interface to accomplish the necessary communications. This problem and others led to initiatives like the Modular Open Systems Approach ("MOSA") by the U.S. Government that required Department Acquisition Programs (e.g., acquisition programs for aircraft technology, ship technology, weapon management technology, electronic warfare technology, and the like) to utilize an "open architecture" that utilizes modular design practices that facilitate component and/or subsystem addition, modification, updating, replacement, and removal.

What is needed is a communications assembly and/or methodology that facilitates electronic communications within a system (e.g., an open architecture system) and makes attainable the goal of "plug and play" modular components within a system.

SUMMARY

It should be understood that any or all of the features or embodiments described herein can be used or combined in any combination with each and every other feature or embodiment described herein unless expressly noted otherwise.

According to an aspect of the present disclosure, a modular cable assembly for use with a system including a first system device and a second system device is provided. The first system device is configured to produce a first at least one electronic communication protocol. The second system device is configured to produce a second at least one electronic communication protocol. The modular cable assembly includes a first connector, a second connector, a cable body extending between and connecting the first connector and the second connector, and a communication control assembly. The communication control assembly includes a communication translation module (CTM) in electronic communication with the first connector and the second connector. The CTM includes a protocol storage submodule configured to store a plurality of predetermined system device protocols (PSDPs) and a processor in communication with the protocol storage submodule storing instructions, which instructions when executed cause the processor to identify the second system device using at least a portion of the second at least one electronic communication protocol and a second selected PSDP of the plurality of PSDPs and translate at least a portion of the second at least one electronic communication protocol into the first at least one electronic communication protocol using the second selected PSDP.

In any of the aspects or embodiments described above and herein, the instructions when executed may cause the processor to translate one or more physical protocol elements associated with the second at least one electronic communication protocol into the first at least one electronic communication protocol using the second selected PSDP.

In any of the aspects or embodiments described above and herein, the instructions when executed may cause the processor to translate one or more logical protocol elements associated with the second at least one electronic communication protocol into the first at least one electronic communication protocol using the second selected PSDP.

In any of the aspects or embodiments described above and herein, the instructions when executed may cause the processor to translate one or more logical protocol elements associated with the second at least one electronic communication protocol into the first at least one electronic communication protocol using the second selected PSDP.

In any of the aspects or embodiments described above and herein, the instructions when executed may cause the processor to translate at least a portion of the first at least one electronic communication protocol into the second at least one electronic communication protocol using the second selected PSDP.

In any of the aspects or embodiments described above and herein, the communication control assembly may be disposed within the second connector.

In any of the aspects or embodiments described above and herein, the cable body may extend between and to a first end and a second end. The cable body may be connected to the first connector at the first end. The cable body may be connected to the second connector at the second end. The communication control assembly may be on the cable body between the first end and the second end.

In any of the aspects or embodiments described above and herein, the CTM may be configured to identify a plurality of system devices for a system. Each system device of the plurality of system devices may be different than each other system device of the plurality of system devices.

In any of the aspects or embodiments described above and herein, the communication control assembly may include a power over data line (PoDL) module configured to receive power from the first system device or the second system device. The PoDL module may be further configured to provide power for the CTM.

In any of the aspects or embodiments described above and herein, the communication control assembly may be configured to encrypt at least a portion of the translated second at least one electronic communication protocol.

According to another aspect of the present disclosure, a method of establishing electronic communications between a first system device of a system and a second system device of the system is provided. The method includes connecting a modular cable assembly to the first system device and the second system device. The modular cable assembly includes a communication translation module (CTM). The CTM includes a protocol storage submodule configured to store a plurality of predetermined system device protocols (PSDPs). The method further includes using the CTM to receive at least one first electronic communication protocol from the first system device and at least one second electronic communication protocol from the second system device, using the CTM and a second selected PSDP of the plurality of PSDPs to identify the second system device, and using the CTM and the second selected PSDP to translate at least a portion of the second at least one electronic communication protocol into the first at least one electronic communication protocol.

In any of the aspects or embodiments described above and herein, the CTM may be configured for bidirectional electronic communications.

In any of the aspects or embodiments described above and herein, translating at least a portion of the second at least one electronic communication protocol may include translating one or more physical protocol elements associated with the at least one second electronic communication protocol into the first at least one electronic communication protocol using the second selected PSDP.

In any of the aspects or embodiments described above and herein, translating at least a portion of the second at least one electronic communication protocol may include translating one or more logical protocol elements associated with the at least one second electronic communication protocol into the first at least one electronic communication protocol using the second selected PSDP.

In any of the aspects or embodiments described above and herein, the method may further include using the first system device to update the protocol storage submodule to include the second selected PSDP prior to using the CTM and the second selected PSDP of the plurality of PSDPs to identify the second system device.

In any of the aspects or embodiments described above and herein, the method may further include replacing the second system device with a third system device and connecting the modular cable assembly to the third system device and using the CTM to receive at least one third electronic communication protocol from the third system device. The third electronic communication protocol may be different than the second electronic communication protocol. The method may further include using the CTM and a third selected PSDP of the plurality of PSDPs to identify the third system device and using the CTM and the third selected PSDP to translate at least a portion of the third at least one electronic communication protocol into the first at least one electronic communication protocol.

In any of the aspects or embodiments described above and herein, the CTM may include a plurality of executable instructions stored in a non-transitory computer readable memory device in communication with a processor dedicated to the CTM.

According to another aspect of the present disclosure, a non-transitory computer-readable medium is disposed in a modular cable assembly. The non-transitory computer-readable medium contains instructions for carrying out a method of establishing electronic communications between a first system device of a system and a second system device of the system. The instructions when executed cause at least one processor to use a communication translation module (CTM) to receive at least one first electronic communication protocol from the first system device and at least one second electronic communication protocol from the second system device. The CTM includes a protocol storage submodule configured to store a plurality of predetermined system device protocols (PSDPs). The instructions when executed further cause at least one processor to use the CTM and a second selected PSDP of the plurality of PSDPs to identify the second system device and use the CTM and the second selected PSDP to translate at least a portion of the second at least one electronic communication protocol into the first at least one electronic communication protocol.

In any of the aspects or embodiments described above and herein, the instructions when executed may further cause at least one processor to use the CTM and the second selected PSDP to translate at least a portion of the first at least one electronic communication protocol into the second at least one electronic communication protocol.

In any of the aspects or embodiments described above and herein, the instructions when executed may further cause at least one processor to use the CTM to simultaneously translate one or more physical protocol elements and one or more logical protocol elements associated with the second at least one electronic communication protocol into the first at least one electronic communication protocol using the second selected PSDP.

The present disclosure, and all its aspects, embodiments and advantages associated therewith will become more readily apparent in view of the detailed description provided below, including the accompanying drawings.

DETAILED DESCRIPTION

Figure 1:
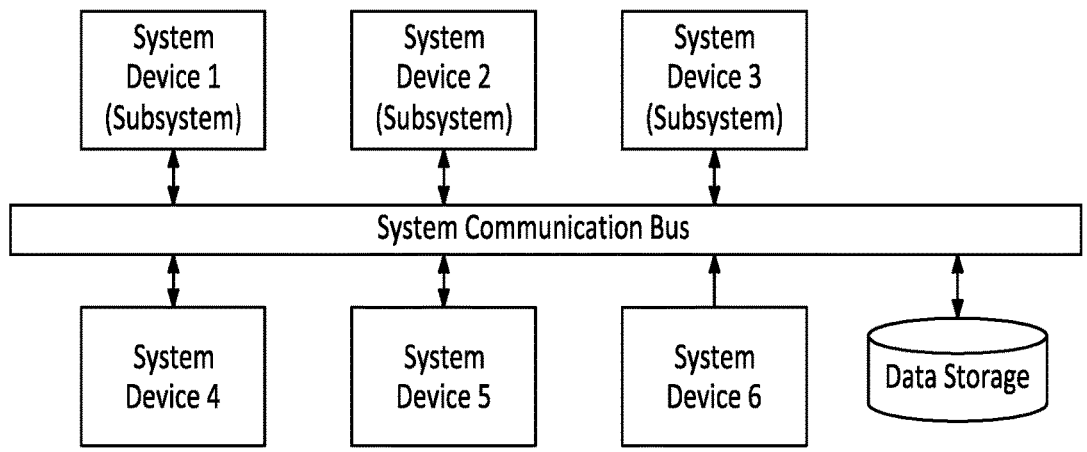
FIG. 1 is a diagrammatic illustration of a single tier system, in accordance with one or more embodiments of the present disclosure.
Figure 2:
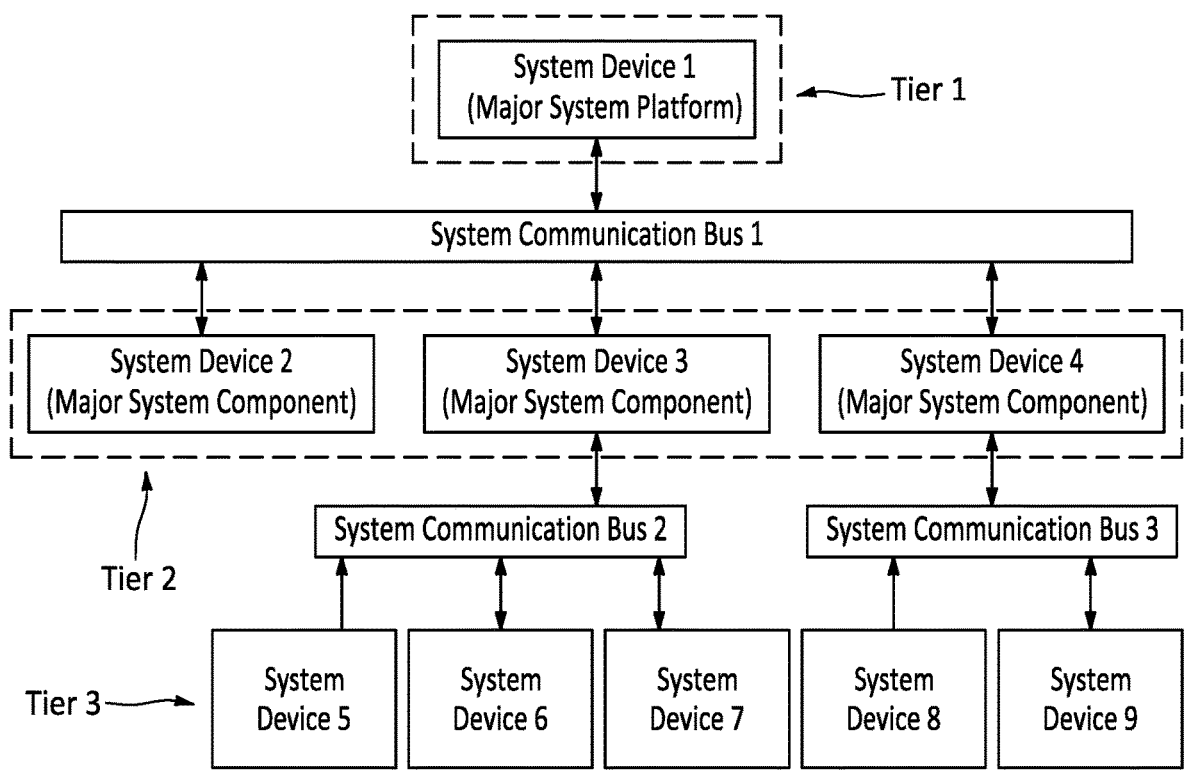
FIG. 2 is a diagrammatic illustration of a multi-tier system, in accordance with one or more embodiments of the present disclosure.

The present disclosure is directed to a modular cable assembly including an electronic communication translation module ("CTM"), a method for using the same that may be used within a system that includes one or more modular cable assemblies, and a non-transitory, computer-readable medium of a modular cable assembly, which medium contains instructions for carrying out the present disclosure method. The present disclosure provides particular utility when implemented with an open architecture system, for example, among others. The system may include a plurality of subsystems, or devices, or other component structures (collectively referred to herein as "system devices") that communicate within the system via electronic communications. It is not required that every system device be in electronic communication with every other system device. Typically, however, each system device is in electronic communication with a plurality of the other system devices. Some system devices may be configured to only transmit electronic communications, other system devices may be configured to only receive electronic communications, and still other system devices may be configured to both receive and transmit electronic communications. Electronic communications travel between system devices via one or more electronic communications pathways, each referred to herein after as a "communication bus," which communication buses may also be referred to herein as system devices. A system may include one or more communication buses. Electronic communications between communication buses, between system devices and communication buses, and/or directly or indirectly between system devices may be established by cables interconnecting the various system devices and communication buses. The present disclosure is not limited to use with any particular type of communication bus, and non-limiting examples of communication buses are provided hereinafter. A system may be configured as a single tier structure or a multi-tier structure. FIG. 1 diagrammatically illustrates a single tier system structure. FIG. 2 diagrammatically illustrates a multi-tier system structure. Within a system, a system device itself may be configured as a single tier structure or a multi-tier structure. The present disclosure is not limited to any particular system configuration or system device configuration.

Present disclosure modular cable assembly embodiments may be configured for use in a variety of different system applications, including defense applications (e.g., defense aircraft platforms, weapon management systems, naval platforms, electronic warfare platforms, and the like, or combinations thereof), commercial aircraft applications, medical device applications, Internet of Things (IoT) applications, and the like. Any of these systems may be an open architecture system. The present disclosure is not limited to use with any particular system application. The communication bus or buses that provide electronic communication between system devices (or within a system device) are configured to communicate in a standardized manner. The particular communication bus standardization (e.g., message sets, protocols, and the like) chosen for an application may vary depending on the particular application. For example, standardized bus communications in a defense application may vary from standardized bus communications in a medical application, or those in an IoT application, etc. To facilitate the description herein, the present disclosure will be described in terms of standardized bus communications that may be utilized in a defense system application. The present disclosure is not, however, limited to use with any particular modularized system architecture or standardized bus communications.

Figure 3:
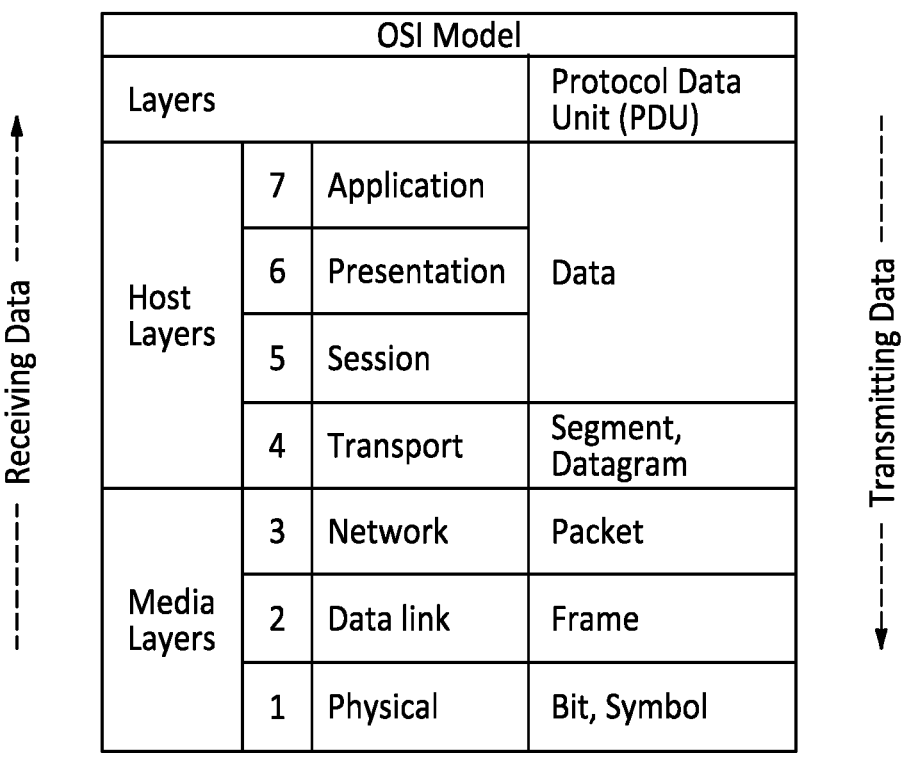
FIG. 3 is a diagrammatic illustration of a communication stack model, in accordance with one or more embodiments of the present disclosure.

As stated above, a defense system application may use a communication bus configured to transfer communications in a standardized format (referred to hereinafter as a "standardized bus format") through the communication bus. For example, a communication bus may be configured to pass data packets in a standardized bus format having defined physical layer characteristics and logical layer characteristics. In terms of physical layer characteristics, a standardized bus format may require the data being transferred be formatted according to Ethernet standards (e.g., TCP/IP standards, UDP/IP standards, etc.), Controller Area Network (CAN) standards, standards that permit serial transfer, or the like. In terms of logical layer characteristics, a standardized bus format may require logical data be in a standardized data format (e.g., data expressed in a predetermined order, physical parameters defined in predetermined units such as Celsius, radians, newtons, etc.). Another example of a logical layer characteristic is the form of the data required by the standardized bus format (e.g., ASCII format, binary format, etc.). FIG. 3 illustrates an example of a communication stack model that may be used as a basis for a standardized bus format. The communication stack model shown in FIG. 3 is an open systems interconnection model ("OSI Model"). As can be seen in FIG. 3, the physical layer lies beneath the logical layers and the ability of the model to receive and transmit data is indicated. The present disclosure is not limited to a standardized bus format based on an OSI Model, or any particular standardized bus format for a data bus.

As stated above, a goal of a modular system is an ability to add or remove and replace system devices that electronically communicate within the system. Historically, the ability to modify a system (e.g., add or remove and replace a system device) and enable the requisite electronic communications has been accomplished either by designing and/or modifying a system device to electronically communicate with the system or by providing a custom software interface that enables the system device to communicate directly with other system devices. Such custom interfaces typically require a software package that translates the communication protocols of the new system device to the communication protocols of each specific system device interacting with the new system device. Hence, before the new system device can be added to the system, it is necessary under existing practices to either modify the new system device or create a translation software package specifically for each new system device. This existing approach is almost always costly and labor intensive, inhibits system updates and reconfigurations, and very often prevents a plug-and-play approach. Adoption of certain interface standards have lessened the task of establishing electronic communications but have not achieved the desired plug-and-play modularity. For example, in an established system it may be desirable to remove and replace an existing system device with an updated system device (e.g., replace an existing global positioning system (GPS) sensor with a new GPS sensor updated to communicate with GPS advances). In such a scenario, both the existing and new GPS sensors may be configured with an RS-422 high-speed serial interface and yet produce data in significantly different formats. In other instances, it may be desirable to change data input into a system. For example, a system update may obviate the need for a first type of sensor input and necessitate the input of a second type of sensor. The original sensor and the new sensor may each be configured with the same type of interface (e.g., a USB interface) but the form of the data produced by the new sensor (e.g., ASCII) is completely different from the form of the data produced by the original sensor (e.g., binary). As can be seen from these examples, absent a custom electronic communications interface, it is very unlikely that such system devices could be swapped out to update or alter an input into the system.

Figure 4:
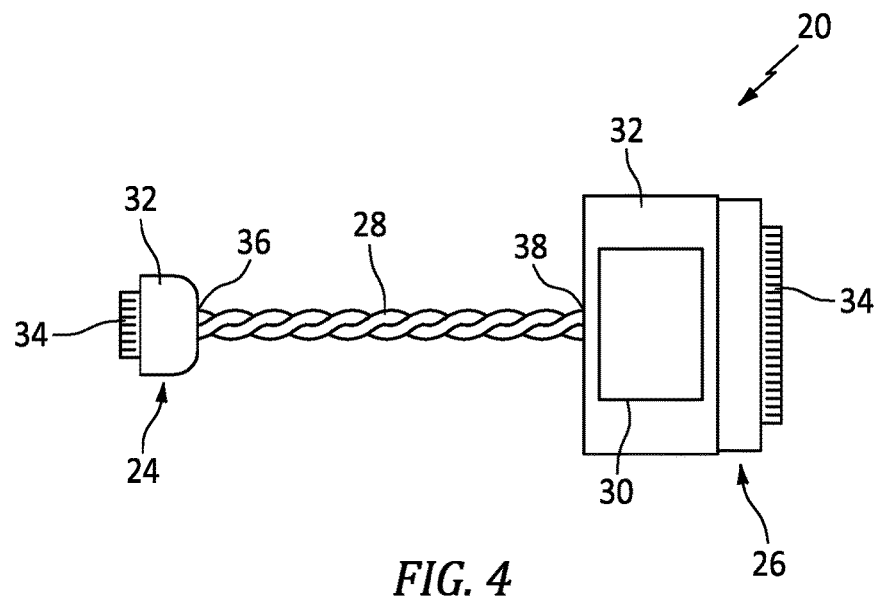
FIG. 4 is a diagrammatic illustration of a modular cable assembly, in accordance with one or more embodiments of the present disclosure.
Figure 5:
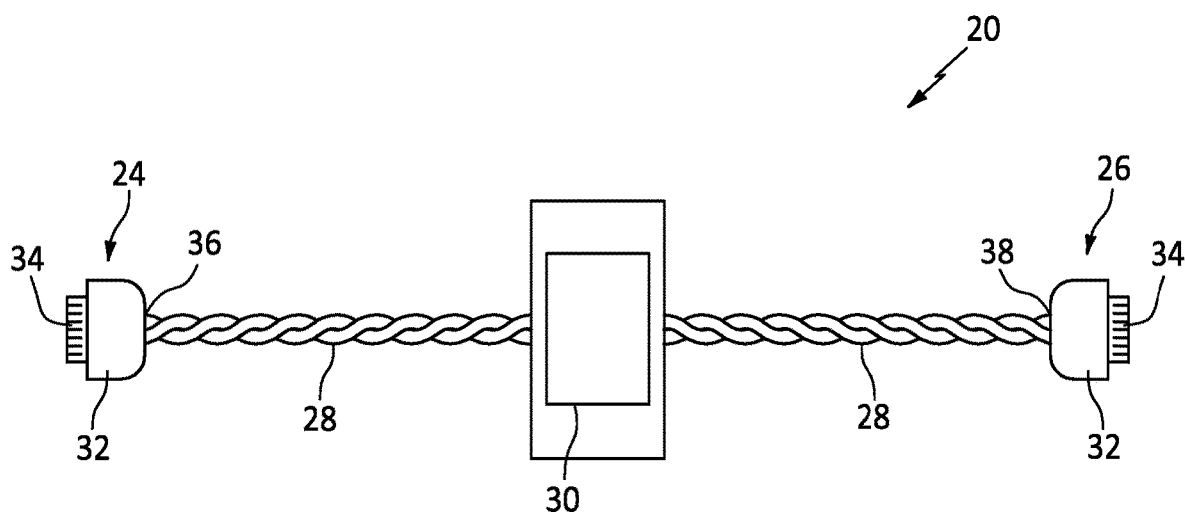
FIG. 5 is a diagrammatic illustration of another modular cable assembly, in accordance with one or more embodiments of the present disclosure.
Figure 6:
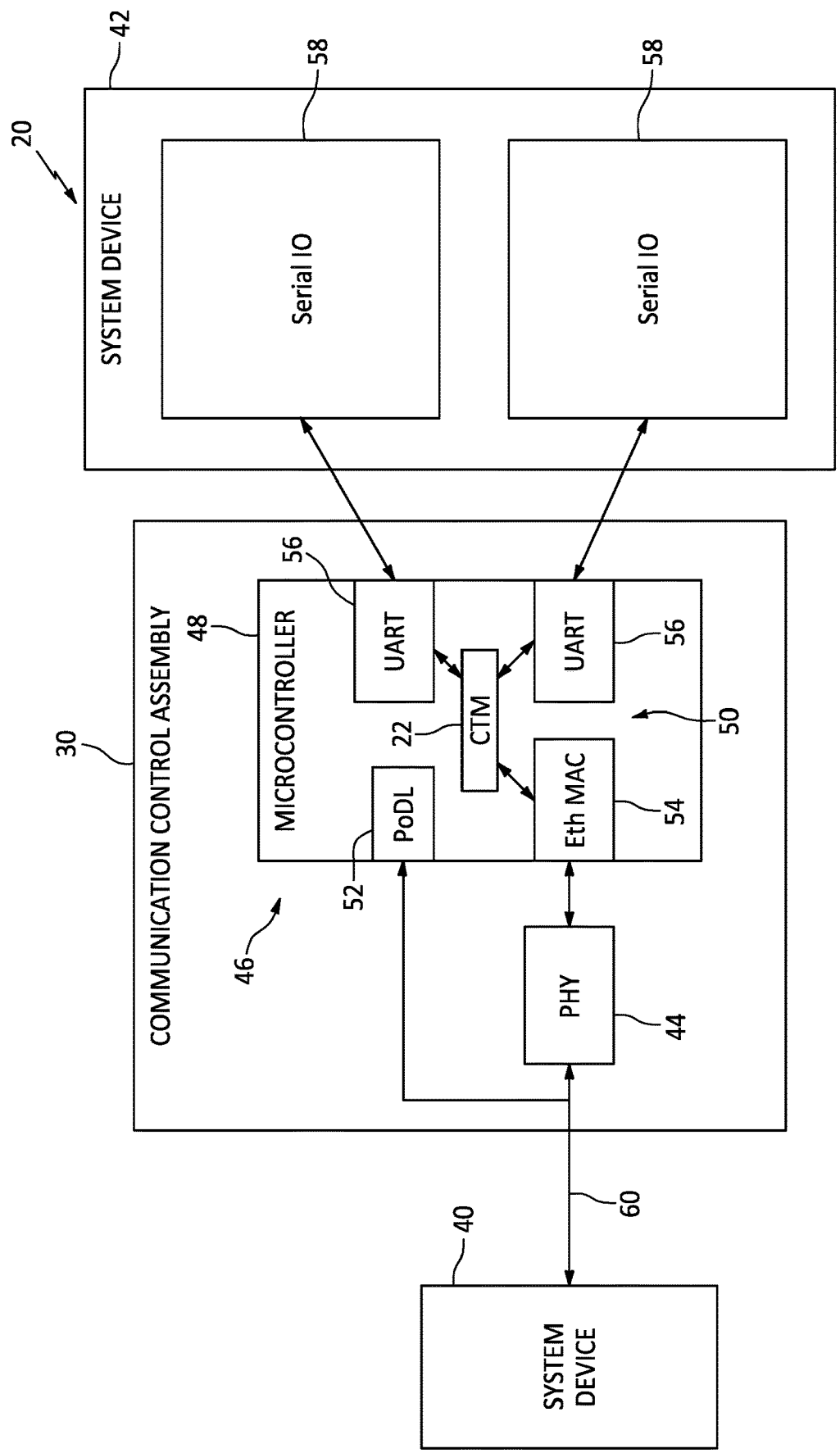
FIG. 6 is a diagrammatic illustration of a portion of a modular cable assembly including a communication control assembly, in accordance with one or more embodiments of the present disclosure.

Referring to FIGS. 4-6, the present disclosure provides a novel and non-obvious electronic modular cable assembly 20 that may be used in a variety of different types of systems, including an open architecture system, and a method that significantly facilitates system electronic communications and makes it possible in many instances to arrive at a plug-and-play level of system modularity. Embodiments of the present disclosure modular cable assembly 20 include a CTM 22 that is configured with instructions that will translate communication protocols utilized by a new system device to a standardized bus format utilized by a communication bus with which the system device is in communication. Further description of a CTM (e.g., the CTM 22) may be found in U.S. patent application Ser. No. 17/672,340, entitled "Communication Translation Module and Method, filed Feb. 15, 2022, which is hereby incorporated by reference in its entirety.

FIGS. 4 and 5 each illustrate exemplary embodiments of the modular cable assembly 20. The modular cable assembly 20 of FIGS. 4 and 5 includes a first connector 24, a second connector 26, a cable body 28, and a communication control assembly 30 including the CTM 22. The present disclosure, however, is not limited to the particular modular cable assembly 20 configurations illustrated in FIGS. 4 and 5.

The first connector 24 and the second connector 26 may each include a housing 32 and one or more conductive members 34. The housing 32 may include an electrically insulating material (e.g., an insulating plastic material) housing portions of the conductive members 34. The conductive members 34 may include, for example, pins, contact pads, fibers, wires, and/or other connectors configured to convey a signal (e.g., an electrical signal). The conductive members 34 may include or otherwise be formed by an electrically conductive material (e.g., copper), however the conductive members 34 are not limited to the use or inclusion of such a material. The modular cable assemblies 20 of FIGS. 4 and 5 include a single first connector 24 and a single second connector 26, however, the modular cable assembly 20 may alternatively including a plurality of first connectors 24 and/or second connectors 26 and the present disclosure is not limited to any particular number of first connectors 24 or second connectors 26 for the modular cable assembly 20. The first connector 24 and the second connector 26 are not limited to any particular connector interface configuration (e.g., 8P8C, USB-C, micro-D, D-subminiature, etc.). Moreover, the first connector 24 and the second connector 26 may have a same or different connector interface configuration.

The cable body 28 of FIGS. 4 and 5 extends between and to a first end 36 of the cable body 28 and a second end 38 of the cable body 28. The cable body 28 of FIGS. 4 and 5 is connected to the first connector 24 at (e.g., on, adjacent, or proximate) the first end 36. The cable body 28 of FIGS. 4 and 5 is connected to the second connector 26 at (e.g., on, adjacent, or proximate) the second end 38. The cable body 28 may include one or more wires (e.g., insulated wires) configured to connect (e.g., electrically connect) the conductive members 34 of the first connector 24 and the connective members 34 of the second connector 26 for directing a signal therebetween.

The communication control assembly 30 may be configured as a circuit card assembly (CCA) included in or otherwise attached to the first connector 24, the second connector 26, or the cable body 28. The second connector 26 of FIG. 4 includes the communication control assembly 30, for example, disposed within the housing 32. The cable body 28 of FIG. 5 includes the communication control assembly 30. For example, the communication control assembly 30 of FIG. 5 is disposed in an intermediate portion of the cable body 28 between the first end 36 and the second end 38. Inclusion of the communication control assembly 30 in the cable body 28 may facilitate reductions in connector (e.g., first connector 24, second connector 26) size. Inclusion of the communication control assembly 30 in the cable body 28 may also facilitate inclusion of the communication control assembly 30 where a form factor of the communication control assembly 30 may be unsuitable for a given connector configuration.

FIG. 6 illustrates a portion of the modular cable assembly 20. The modular cable assembly 20 of FIG. 6 is connected to a first system device 40 and a second system device 42. The interface between the communication control assembly 30, the first system device 40, and the second system device 42 of FIG. 6 may be accomplished, for example, using the modular cable assembly 20 embodiments of FIG. 4 or FIG. 5. The communication control assembly 30 of FIG. 6 includes an Ethernet physical layer transceiver (PHY) 44 and a communication controller 46. The present disclosure, however, is not limited to the use of an Ethernet configured PHY. The PHY 44 of FIG. 6 is in electronic communication with the first system device 40 using an Ethernet signal path 60 (e.g., an Ethernet wiring configuration such as an unshielded twisted-pair (UTP) configuration) formed, for example, by the first connector 24 and the cable body 28 (see FIGS. 4 and 5). The communication controller 46 of FIG. 6 is in electronic communication with the PHY 44 and the second system device 42. The communication controller 46 may be configured, for example, as a microcontroller, a Field-Programmable Gate Array (FPGA), or other suitable integrated circuit. The communication controller 46 of FIG. 6 is configured as a microcontroller 48, which microcontroller 48 includes physical protocol interface hardware 50, a power module 52, and the CTM 22.

Physical protocol interface hardware 50 includes any onboard hardware necessary for the communication controller 46 to interface with the physical protocol layers of the system devices (e.g., the first system device 40 and the second system device 42) to which the modular cable assembly 20 is connected. The physical protocol interface hardware 50 may include, for example, an Ethernet Medium Access Control (MAC) 54 and one or more Universal Asynchronous Receiver-Transmitters (UARTs) 56, as shown for the physical protocol interface hardware 50 of FIG. 6. The physical protocol interface hardware 50 may additionally or alternatively include other hardware such as, but not limited to, Peripheral Component Interconnect Express (PCIe) hardware, Serial Rapid I/O, Aurora Bus, Mil-Std 1553 Bus, SERDES (serializer/deserializer), and the like. As an example, the physical protocol interface hardware 50 may be configured to support electronic communication between PCIe and UART hardware. The Ethernet MAC 54 is in electronic communication with the PHY 44. The UARTs 56 of FIG. 6 are in electronic communication (e.g., serial communication) with respective peripherals 58 of the second system device 42. The physical protocol interface hardware 50 of FIG. 6 includes two UARTs 56 and is configured to interface with the two respective peripherals 58 simultaneously. The physical protocol interface hardware 50 of the present disclosure communication controller 46 may, of course, include a single UART 56 configured to interface with a single peripheral 58 or system device.

The power module 52 is configured to provide electrical power for operation of the communication controller 46 and its components. The power module 52 may have a power over data line (PoDL) configuration for transferring power from power sourcing equipment (PSE), such as the first system device 40, to the communication controller 46 via Ethernet wiring. For example, the power module 52 of FIG. 6 may receive power from the first system device 40 through an unshielded twisted-pair (UTP) segment of the Ethernet signal path 60. The power module 52 may, therefore, receive power from the Ethernet signal path 60 used for data transmission and may provide power for operation of the communication controller 46 and its components even when data is not being transferred over the Ethernet signal path 60.

Figure 7:
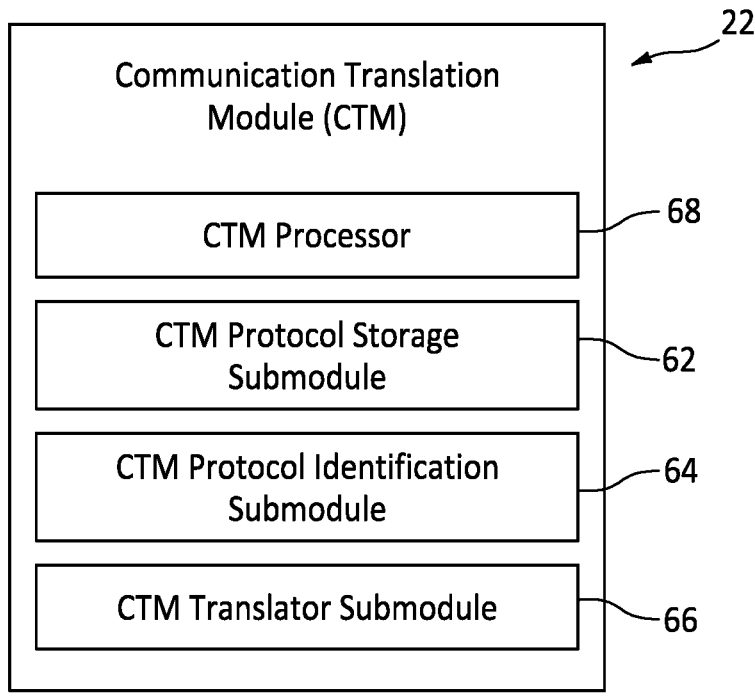
FIG. 7 is a diagrammatic illustration of a communication translation module (CTM), in accordance with one or more embodiments of the present disclosure.
Figure 8:
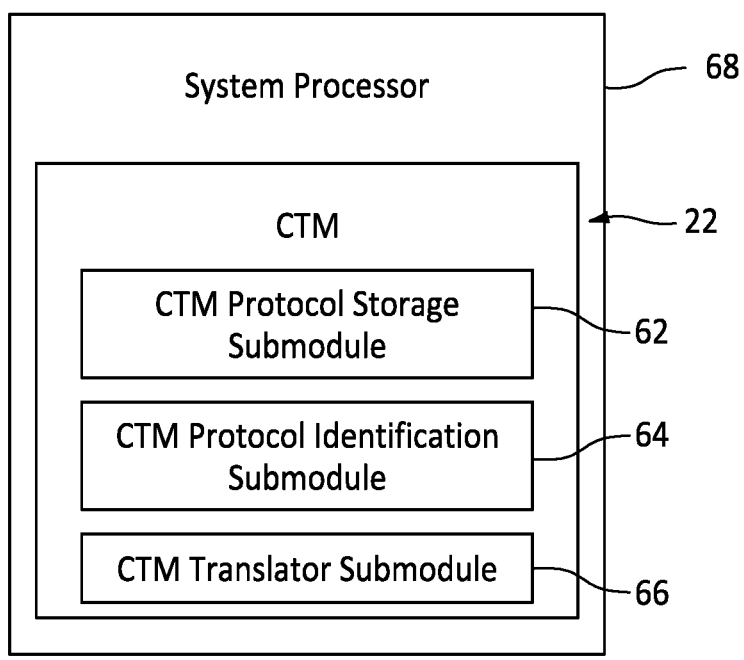
FIG. 8 is a diagrammatic illustration of another communication translation module (CTM), in accordance with one or more embodiments of the present disclosure.
Figure 9:
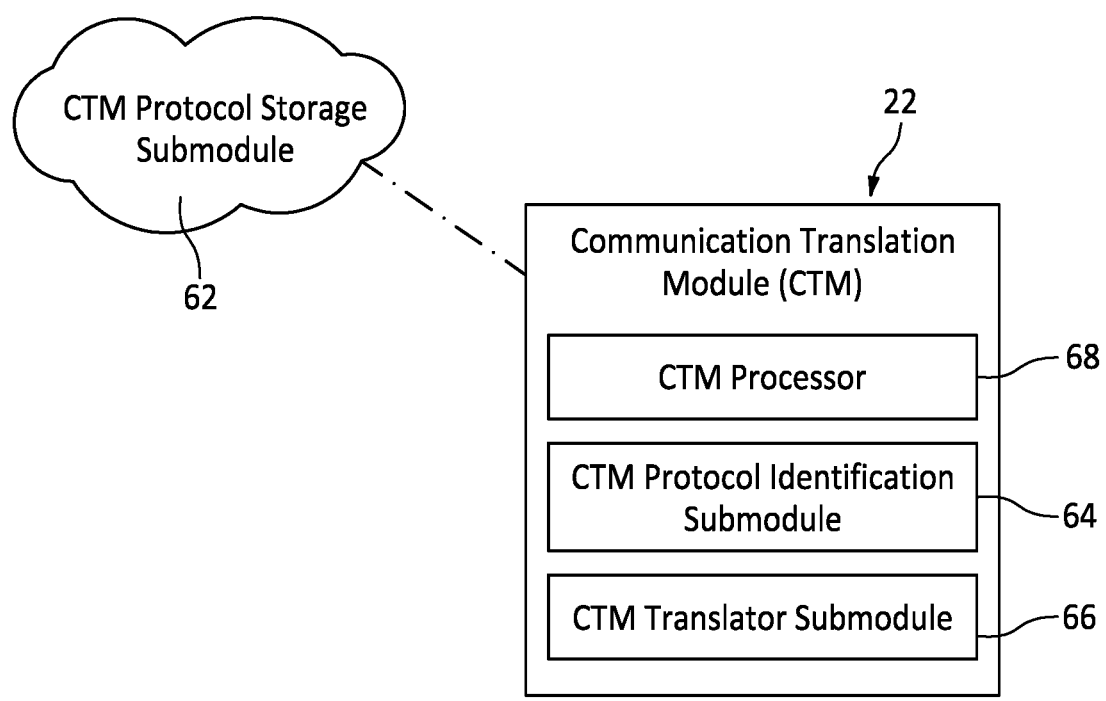
FIG. 9 is a diagrammatic illustration of another communication translation module (CTM), in accordance with one or more embodiments of the present disclosure.

Referring to FIGS. 7-9, exemplary embodiments of the present disclosure CTM 22 are illustrated. As will be clear from the description herein, the CTM 22 may also be described as a "composable translation module" because it can be composed to translate a variety of different system device communication protocols. Embodiments of the present disclosure CTM 22 are configured with instructions that will translate communication protocols utilized by a second system device (e.g., a new third-party system device) to a format utilized by another first system device or communication bus with which the second system device is in communication via the modular cable assembly 20 (see FIGS. 4-6).

The CTM 22 includes or is in communication with a protocol storage submodule 62, a protocol identification submodule 64, and a translator submodule 66. The aforesaid submodules are described herein separately in terms of functionality to facilitate the description. Each of these submodules may include a set of stored instructions (e.g., software) executable by a processor to perform the described functionalities and may include or function with hardware (e.g., a memory device). The CTM 22 may include further stored instructions to facilitate the functionalities described herein (e.g., to coordinate the operation of the submodules). The submodules may be separate or combined with one another and the present disclosure is not limited to any particular configuration unless otherwise described herein. The CTM instructions may be executed by a processor 68 to effectuate electronic communications between a first system device and a second system device via the modular cable assembly 20 (see FIGS. 4-6). The aforesaid processor 68 may be dedicated to the CTM 22, or alternatively the CTM 22 may be hosted by a processor 68A within the communication controller 46 (see FIG. 6) that provides functionality beyond the CTM 22. The term "processor" as used herein refers to any type of computing device, computational circuit, processor(s), microprocessor(s), CPU, computer, or the like capable of executing a series of instructions that are stored in memory. The instructions may include an operating system, and/or executable software modules such as program files, stored data, buffers, drivers, utilities, and the like. In some embodiments, the instructions may be stored in a form other than software (e.g., firmware or the like). The executable instructions may apply to any functionality described herein to enable the CTM 22 to accomplish the same. The processor 68 includes or is in communication with one or more memory devices. The memory device is not limited to any particular type of memory device, and the memory device may store instructions and/or data in a non-transitory manner. Examples of memory devices that may be used include read-only memory, random access memory, volatile memory, non-volatile memory, static memory, dynamic memory, flash memory, cache memory, and/or any device that stores digital information.

The protocol storage submodule 62 includes or is a memory device (e.g., as described above) that stores a plurality of predetermined system device protocols ("PSDP"). Each PSDP is associated with the communication protocol(s) produced by a system device and is used for translating those communication protocol(s). Each PSDP may include instructions configured to permit translation (e.g., simultaneous translation) of physical and/or logical protocol elements associated with the system device communication protocol(s) to other physical and/or logical protocol elements which are readable and transferable by another system device. Each PSDP may include instructions configured to permit translation (e.g., simultaneous translation) of physical and/or logical protocol elements associated with the system device communication protocol(s) to standardized bus format that is transferrable along a communication bus of the system. In some embodiments, a PSDP may also include instructions that provide a mapping for system device communications. The PSDPs may include an identifier portion that may be used by the protocol identification submodule to identify a protocol received from a new system device (e.g., by comparison between the identifier portion and at least a portion of the new system device protocol). A PSDP stored in the protocol storage submodule may be associated with a system device such as a commercial off-the-shelf (COTS) device, or a known subsystem, or the like. In some embodiments, the protocol storage submodule 62 may store a substantial number of PSDPs to facilitate plug-and-play of a substantial number of system devices. The protocol storage submodule 62 may be in direct communication with the CTM processor 68, and the PSDPs may be a portion of CTM instructions. For example, in those instances wherein a CTM 22 includes a dedicated processor 68, the CTM 22 may also include one or more memory devices operable to store CTM instructions. One or more of the CTM's memory devices (or a portion of one of the CTM memory devices) may function as the protocol storage submodule 62. Similarly, if the CTM 22 is hosted by a processor 68A not dedicated to the CTM 22, a memory device in communication with that processor 68A may function as the protocol storage submodule 62. In some embodiments, the protocol storage submodule 62 may be in electronic communication with the CTM 22 but remotely located. For example, the protocol storage submodule 62 may be cloud based (see, e.g., FIG. 9).

The protocol identification submodule 64 may be a plurality of executable instructions configured to identify a new system device (e.g., a system device to which the modular cable assembly 20 has been physically connected, see FIGS. 4-6) using at least part of a protocol produced by the new system device. The modular cable assembly 20 and its communication controller 46 may be configured such that a new system device will produce an unsolicited initial communication to the communication controller 46 or may be configured to produce an initial communication to the communication controller 46 upon being prompted to do so (see FIG. 6). Either way, the initial communication is received by the CTM 22 and is evaluated by the protocol identification submodule 64 using the protocol storage submodule 62. For example, and as described above, PSDPs stored within the protocol storage submodule 62 may each have an identifier portion. The protocol identification submodule 64 may identify a new system device by comparing the protocol (or a portion thereof) produced by the new system device to the stored PSDP identifier portions. Once the appropriate PSDP is identified, that PSDP can be flagged for use by the translator submodule 66 to permit electronic communications between the new system device and another system device or communication bus (and vice versa if the electronic communications are bidirectional). The present disclosure is not limited to any particular process for identifying new system devices other than using the PSDPs (e.g., using the identifier portions of the PSDPs) stored in the protocol storage submodule 62 (e.g., an identifier portion may be a portion or all of a respective PSDP), and the identification process may use a comparative step, or a logic tree process, or the like.

The translator submodule 66 may be a plurality of executable instructions configured to use a selected PSDP to translate all or a portion of a first system device protocol for a first system device into a different second system device protocol for communication with a second system device or communication bus. The specific translation performed by the translator submodule 66 may vary depending upon the specifics of the different system device protocols. The translator submodule 66 may parse and translate one or more physical protocol elements from the first system device protocol into physical protocol elements associated with the second system device protocol, or the translator submodule 66 may translate one or more logical protocol elements from the first system device protocol into logical protocol elements associated with the second system device protocol, or the translator submodule 66 may translate some combination of physical and logical protocol elements. In some embodiments, the translator submodule 66 may translate multiple protocol layers simultaneously (e.g., translate one or more physical layers simultaneously, one or more logical layers simultaneously, translate one or more physical layers and one or more logical layers simultaneously, etc.). As stated above, in some instances the translator submodule 66 may provide a mapping for the system device protocol.

Figure 10:
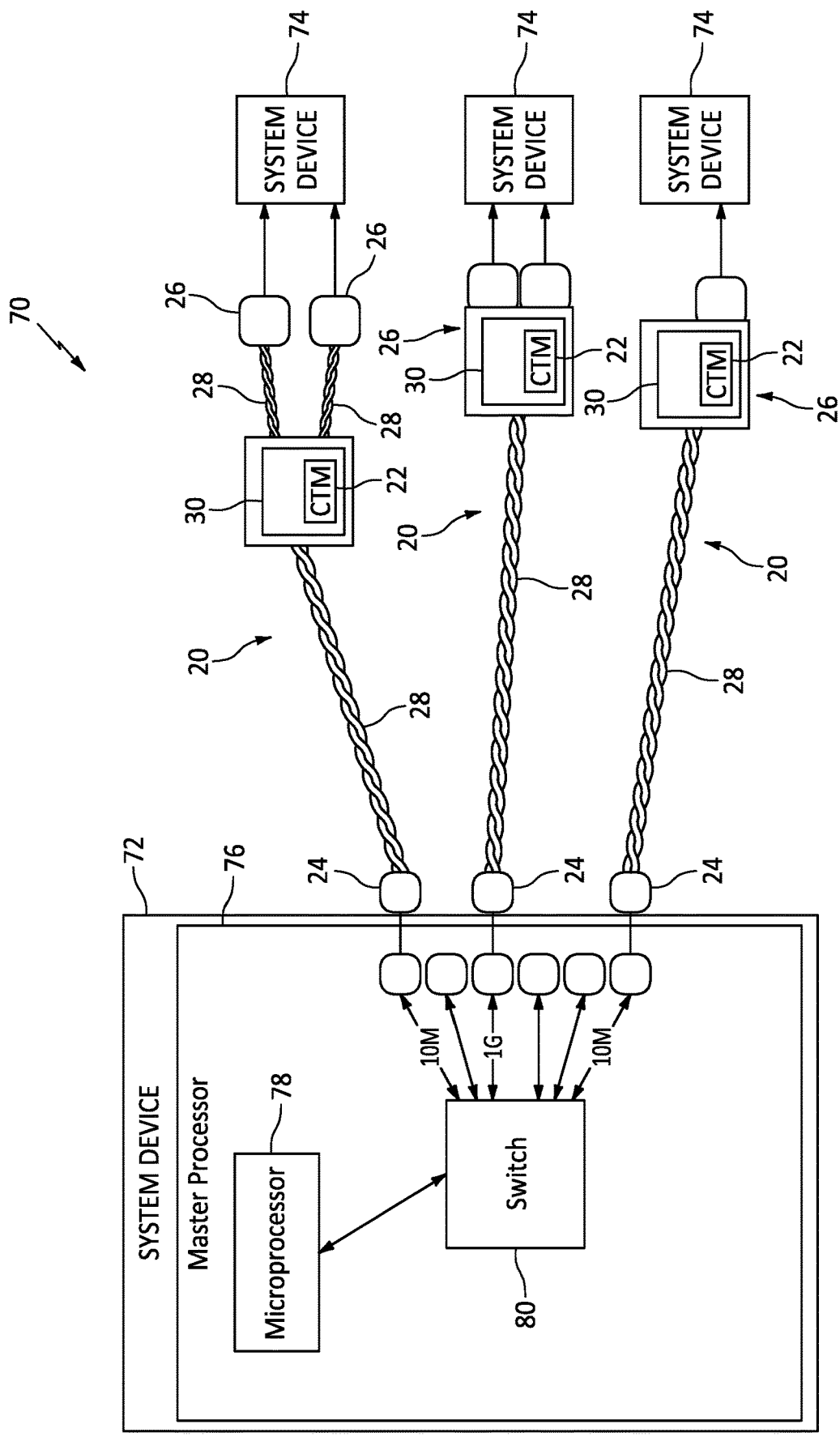
FIG. 10 is a diagrammatic illustration of a system including system devices interconnected by modular cable assemblies, in accordance with one or more embodiments of the present disclosure.
Figure 11:
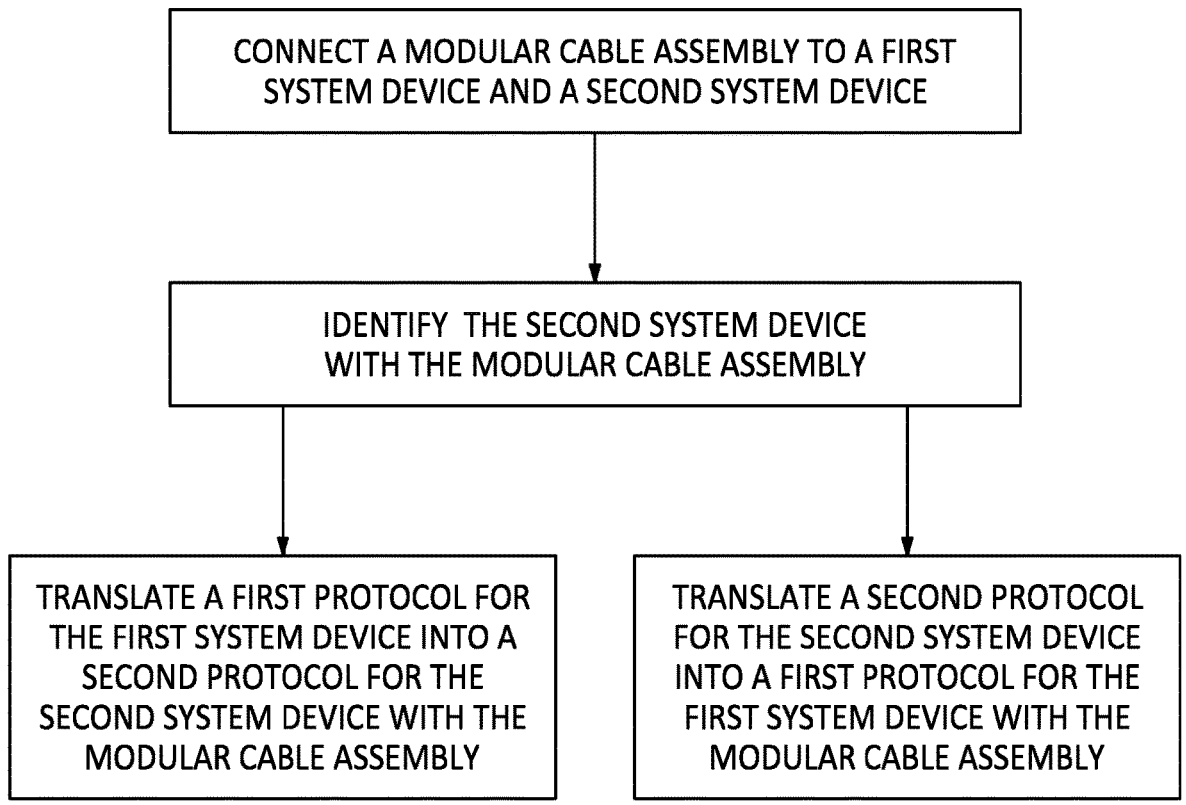
FIG. 11 is a flow diagram representing a methodology, in accordance with one or more embodiments of the present disclosure.

Referring to FIG. 10, to illustrate the utility of the present disclosure, an exemplary application of the modular cable assembly 20 for establishing electronic communications between system devices of a system 70 is provided. The system 70 of FIG. 10 is configured as an open-architecture system and includes a first system device 72, a plurality of second system devices 74, and a plurality of modular cable assemblies 20. Each second system device 74 is connected in electronic communication with the first system device 72 by a respective one of the modular cable assemblies 20.

The first system device 72 includes a master processor 76 for the system 70. The master processor 76 may be configured, for example, as a circuit card assembly (CCA) for the first system device 72. The master processor 76 includes a processor 78 (e.g., as described above). In some embodiments, such as the master processor 76 embodiment of FIG. 10, the master processor 76 may additionally include a switch 80 in electronic communication with the processor 78. It should be understood, of course, that system devices of the present disclosure are not limited to the particular configuration of the first system device 72 or its master processor 76 illustrated in FIG. 10. The first system device 72 of FIG. 10, for example, may have an Ethernet physical protocol configuration and a logical protocol configuration which conforms to a MOSA interface standard.

The plurality of second system devices 74 of FIG. 10 includes three second system devices 74 of the system 70. Each of the three second system devices 74 are connected in electronic communication with the master processor 76 by a respective modular cable assembly 20. The present disclosure, however, is not limited to any particular number of system devices which may be connected to another system device (e.g., by one or more modular cable assemblies 20). As an example, each second system device 74 of FIG. 10 is connected (e.g., directly, or indirectly) to the switch 80 by one of the modular cable assemblies 20 of FIG. 10. The second system devices 74 may be third-party devices such as vendor-provided devices, COTS devices, or the like. Each of the second system devices 74 may have physical protocol configurations and/or logical protocol configurations which are different than those of the first systems device 72. Moreover, each of the second system devices 74 may have physical protocol configurations and/or logical protocol configurations which are different than those of one or more other second system devices 74. For example, each of the second system devices 74 may have a serial physical protocol configuration (e.g., RS-422) and a vendor-specific logical protocol configuration.

For the system 70 of FIG. 10, the CTM 22 of each modular cable assembly 20 converts both the physical and logical protocols of the system devices (e.g., the first system device 72 and a second system device 74) being interfaced. In the example of FIG. 10, the physical protocol of each second system device 74 is converted from RS-422 serial to Ethernet and the logical protocol is converted from vendor-specific to being compliant with the appropriate MOSA domain specification message set for the first system device 72. Each of the modular cable assemblies 20 of FIG. 10 are in electronic communication with to the Ethernet switch 80 located on the master processor 76 card. Data from the second system devices 74 is routed from the switch 80 to the processor 78 where software applications for the system 70 may be executed or otherwise controlled.

In some embodiments, the PHY 44 (e.g., the Ethernet PHY 44 of FIG. 6) for a communication control assembly 30 may be configured to encrypt data traffic between system devices (e.g., the first system device 70 and a second system device 72) connected by the modular cable assembly 20. For example, the PHY 44 may be configured to (1) encrypt data traffic directed from the first system device 70 to the second system device 72 through the modular cable assembly 20 and/or (2) encrypt data traffic directed from the second system device 72 to the second system device 70 through the modular cable assembly 20. In this regard, for example, the modular cable assembly 20 may be configured to isolate a second system device 72, such as a vendor device, from other system devices of the system 70 (e.g., the first system device 72 and others of the second system devices 74). Encryption may be implemented, for example, by the PHY 44 of one or more modular cable assemblies 20 and the master processor 76 (e.g., the switch 80) of the first system device 72. Encryption and authentication standards such as, but not limited to, MACsec/802.1AE, may implemented by the modular cable assemblies 20 and other system devices of the system 70.

Referring to FIGS. 7-11, the present disclosure modular cable assembly 20 and its CTM 22 are configured to enable electronic communications between different system devices, such as the first system device 72 and second system devices 74 of FIG. 10. Electronic communications enable by the modular cable assembly 20 may be unidirectional (e.g., from the second system device 74 to the first system device 72) or bidirectional.

The modular cable assembly 20 may be introduced to the system 70 by connecting the modular cable assembly 20 to the first system device 72. For example, the first connector 24 may be physically connected to or otherwise installed on the first system device 72 (e.g., the switch 80). As stated above, the first system device 72 of FIG. 10 is a master processor 76 for the system 70, which master processor 76 has an Ethernet physical protocol configuration and a logical protocol configuration which conforms to a MOSA interface standard. The present disclosure, of course, is not limited to the particular configuration of the first system device 72 of FIG. 10. Connection between the modular cable assembly 20 and a system device, such as the first system device 72, may cause the power module 52 (e.g., having a PoDL configuration) to provide power for operation of the communication controller 46.

The modular cable assembly 20 may be connected to the second system device 74. For example, the second connector 26 may be physically connected to or otherwise installed on the second system device 74. With the modular cable assembly 20 connected to the second system device 74, the second system device 74 may be configured to produce an unsolicited initial communication to the communication controller 46 or may be configured to produce an initial communication to the communication controller 46 upon being prompted to do so. Either way, the initial communication may be received by the CTM 22. The CTM protocol identification submodule 64 may identify the second system device 74 on the basis of the initial communication and by using the protocol storage submodule 62. For example, the protocol identification submodule 64 may access the protocol storage submodule 62 to find a PSDP stored in the protocol storage submodule 62 that corresponds with the initial communication from the second system device 74. As stated above, the process of identifying a PSDP that corresponds with the initial communication from a system device (e.g., the second system device 74) may take a variety of different forms (e.g., each of the stored PSDPs may have an identifier portion that can be compared to a portion or all of the communication from the system device to determine correspondence). The present disclosure is not limited to any particular methodology for identifying a system device (e.g., a system device undergoing a connection to the modular cable assembly 20).

Once the appropriate PSDP is identified for the second system device 74, the PSDP may be used by the translator submodule 66 to (1) translate all or a portion of a first system device protocol of the first system device 72 to a second system device protocol of the second system device 74 to permit data transmission from the first system device 72 to the second system device 74 via the modular cable assembly 20 and/or (2) translate all or a portion of a second system device protocol of the second system device 74 to a first system device protocol of the first system device 72 to permit data transmission from the second system device 74 to the first system device 72 via the modular cable assembly 20. Translation of the first system device protocol and/or the second system device protocol may additionally include encryption or decryption of the first system device protocol and/or the second system device protocol. As stated above, the specific translation performed by the translator submodule 66 may vary depending upon the specifics of the system devices (e.g., the first system device 72 and the second system device 74). The translator submodule 66 may parse and translate one or more physical protocol elements from the first system device protocol into physical protocol elements associated with the second system device protocol, or the translator submodule 66 may translate one or more logical protocol elements from the first system device protocol into logical protocol elements associated with the second system device protocol, or the translator submodule 66 may translate some combination of physical and logical protocols elements. Similarly, the translator submodule 66 may parse and translate one or more physical protocol elements from the second system device protocol into physical protocol elements associated with the first system device protocol, or the translator submodule 66 may translate one or more logical protocol elements from the second system device protocol into logical protocol elements associated with the first system device protocol, or the translator submodule 66 may translate some combination of physical and logical protocols elements. In addition, and as stated above, some embodiments of the translator submodule 66 may be configured to translate multiple protocol layers simultaneously and may be configured to provide a mapping for the translated system device protocols within the system 70.

As is clear from the above description and examples, the present disclosure modular cable assembly 20 facilitates system electronic communications and modularization and makes it possible in many instances to have a plug-and-play level of system modularity which does not require any system redesign or recompiling. In many cases, the present disclosure may obviate the inclusion of separate circuit cards and/or personality modules which might otherwise be used to perform interface processing for a system. The present disclosure may also facilitate electronic communications between system devices using a substantially reduced number of wires. As an example, a particular vendor device may have 20 signal wires which may need to extend from the vendor device to a master processor in order to integrate the vendor device into an electronic system. Using the present disclosure modular cable assembly to connect the vendor device to the master processor, the 20 signal wires used to transmit signals to and from the vendor device may only to extend a few inches or less to the communication control assembly 30. The above-noted features of the present disclosure modular cable assembly 20 may, therefore, facilitate reductions in electronic system size, weight, power use, and cost.

In some instances, it may be desirable to introduce a new system device into a system (e.g., the system 70), which system device is then not then recognizable by a CTM 22 of a modular cable assembly 20 which may be used for connecting the new system device into the system. For example, the protocol storage submodule 62 of the CTM 22 may not then currently include a PSDP that corresponds to the new system device. In such instances, the protocol storage submodule 62 may be updated to include the appropriate PSDP for the new system device. For example, the protocol storage submodule 62 may be updated prior to the installation of the new system device and the associated modular cable assembly 20 into the system 70. Alternatively, the modular cable assembly 20 may be currently installed in the system 70 and connected to a system device such as the first system device 72. The protocol storage submodule 62 may be updated to include the appropriate PSDP for the new system device by way of the modular cable assembly 20 connection (e.g., Ethernet electronic communication) with the first system device 72. In some instances, CTMs 22 may be configured for periodic updating of the protocol storage submodule 62 (e.g., to add new PSDPs, and/or to remove outdated PSDPs, etc.). In this manner, a present disclosure CTM 22 may facilitate the ability of a system 70 to operate with a plug-and-play modularity over a greater period of time without the need for system redesign or recompilation. In some embodiments, a CTM 22 may be configured to automatically update its protocol storage submodule 62 with a new PSDP that corresponds with a new system device that was not previously recognizable by the CTM 22. In these instances, the CTM 22 may include instructions that parse the communications from the new system device and prepare an appropriate PSDP based on the parsed data from the new system device communications.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. A modular cable assembly for use with a system including a first system device and a second system device, the first system device configured to produce a first at least one electronic communication protocol, the second system device configured to produce a second at least one electronic communication protocol, the modular cable assembly comprising:
   a first connector;
   a second connector;
   a cable body extending between and connecting the first connector and the second connector; and
   a communication control assembly including a communication translation module (CTM) in electronic communication with the first connector and the second connector, the CTM including:
      a protocol storage submodule configured to store a plurality of predetermined system device protocols (PSDPs); and
      a processor in communication with the protocol storage submodule storing instructions, which instructions when executed cause the processor to:
         identify the second system device using at least a portion of the second at least one electronic communication protocol and a second selected PSDP of the plurality of PSDPs; and
         translate at least a portion of the second at least one electronic communication protocol into the first at least one electronic communication protocol using the second selected PSDP.

2. The modular cable assembly of claim 1, wherein the instructions when executed cause the processor to translate one or more physical protocol elements associated with the second at least one electronic communication protocol into the first at least one electronic communication protocol using the second selected PSDP.

3. The modular cable assembly of claim 2, wherein the instructions when executed cause the processor to translate one or more logical protocol elements associated with the second at least one electronic communication protocol into the first at least one electronic communication protocol using the second selected PSDP.

4. The modular cable assembly of claim 1, wherein the instructions when executed cause the processor to translate one or more logical protocol elements associated with the second at least one electronic communication protocol into the first at least one electronic communication protocol using the second selected PSDP.

5. The modular cable assembly of claim 1, wherein the instructions when executed cause the processor to translate at least a portion of the first at least one electronic communication protocol into the second at least one electronic communication protocol using the second selected PSDP.

6. The modular cable assembly of claim 1, wherein the communication control assembly is disposed within the second connector.

7. The modular cable assembly of claim 1, wherein the cable body extends between and to a first end and a second end, the cable body connected to the first connector at the first end, the cable body connected to the second connector at the second end, the communication control assembly on the cable body between the first end and the second end.

8. The modular cable assembly of claim 1, wherein the CTM is configured to identify a plurality of system devices for a system, each system device of the plurality of system devices different than each other system device of the plurality of system devices.

9. The modular cable assembly of claim 1, wherein the communication control assembly includes a power over data line (PoDL) module configured to receive power from the first system device or the second system device, the PoDL module further configured to provide power for the CTM.

10. The modular cable assembly of claim 1, wherein the communication control assembly is configured to encrypt at least a portion of the translated second at least one electronic communication protocol.

11. A method of establishing electronic communications between a first system device of a system and a second system device of the system, the method comprising:
  connecting a modular cable assembly to the first system device and the second system device, the modular cable assembly including a communication translation module (CTM), the CTM including a protocol storage submodule configured to store a plurality of predetermined system device protocols (PSDPs);
  using the CTM to receive at least one first electronic communication protocol from the first system device and at least one second electronic communication protocol from the second system device;
  using the CTM and a second selected PSDP of the plurality of PSDPs to identify the second system device; and
  using the CTM and the second selected PSDP to translate at least a portion of the second at least one electronic communication protocol into the first at least one electronic communication protocol.

12. The method of claim 11, wherein the CTM is configured for bidirectional electronic communications.

13. The method of claim 11, wherein translating at least a portion of the second at least one electronic communication protocol includes translating one or more physical protocol elements associated with the at least one second electronic communication protocol into the first at least one electronic communication protocol using the second selected PSDP.

14. The method of claim 11, wherein translating at least a portion of the second at least one electronic communication protocol includes translating one or more logical protocol elements associated with the at least one second electronic communication protocol into the first at least one electronic communication protocol using the second selected PSDP.

15. The method of claim 11, further comprising using the first system device to update the protocol storage submodule to include the second selected PSDP prior to using the CTM and the second selected PSDP of the plurality of PSDPs to identify the second system device.

16. The method of claim 11 further comprising:
  replacing the second system device with a third system device and connecting the modular cable assembly to the third system device;
  using the CTM to receive at least one third electronic communication protocol from the third system device, the third electronic communication protocol different than the second electronic communication protocol;
  using the CTM and a third selected PSDP of the plurality of PSDPs to identify the third system device; and
  using the CTM and the third selected PSDP to translate at least a portion of the third at least one electronic communication protocol into the first at least one electronic communication protocol.

17. The method of claim 11, wherein the CTM includes a plurality of executable instructions stored in a non-transitory computer readable memory device in communication with a processor dedicated to the CTM.

18. A non-transitory computer-readable medium disposed in a modular cable assembly, the non-transitory computer-readable medium containing instructions for carrying out a method of establishing electronic communications between a first system device of a system and a second system device of the system, the instructions when executed cause at least one processor to:
  use a communication translation module (CTM) to receive at least one first electronic communication protocol from the first system device and at least one second electronic communication protocol from the second system device, the CTM including a protocol storage submodule configured to store a plurality of predetermined system device protocols (PSDPs);
  use the CTM and a second selected PSDP of the plurality of PSDPs to identify the second system device; and
  use the CTM and the second selected PSDP to translate at least a portion of the second at least one electronic communication protocol into the first at least one electronic communication protocol.

19. The non-transitory computer-readable medium of claim 18, wherein the instructions when executed cause at least one processor to:
  use the CTM and the second selected PSDP to translate at least a portion of the first at least one electronic communication protocol into the second at least one electronic communication protocol.

20. The non-transitory computer-readable medium of claim 18, wherein the instructions when executed cause at least one processor to:
  use the CTM to simultaneously translate one or more physical protocol elements and one or more logical protocol elements associated with the second at least one electronic communication protocol into the first at least one electronic communication protocol using the second selected PSDP.

* * * * *